United States Patent
Heo

(10) Patent No.: US 9,731,651 B2
(45) Date of Patent: Aug. 15, 2017

(54) METHOD AND APPARATUS FOR OUTPUTTING VEHICLE ALARM INFORMATION USING MOBILE DEVICES

(71) Applicant: HYUNDAI MOTOR COMPANY, Seoul (KR)

(72) Inventor: Keun Hang Heo, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 36 days.

(21) Appl. No.: 14/835,593

(22) Filed: Aug. 25, 2015

(65) Prior Publication Data

US 2016/0236614 A1    Aug. 18, 2016

(30) Foreign Application Priority Data

Feb. 12, 2015  (KR) .................. 10-2015-0021586

(51) Int. Cl.
| | |
|---|---|
| G08G 1/00 | (2006.01) |
| B60Q 9/00 | (2006.01) |
| G08B 7/06 | (2006.01) |
| G08B 25/08 | (2006.01) |
| H04W 4/00 | (2009.01) |

(52) U.S. Cl.
CPC ................ B60Q 9/00 (2013.01); G08B 7/06 (2013.01); G08B 25/08 (2013.01); H04W 4/005 (2013.01)

(58) Field of Classification Search
CPC .. B60Q 9/00; G08B 25/10; G08B 7/06; G06F 21/554; H04W 72/10; H04L 47/24
USPC ......... 340/901, 502, 517, 3.1, 5.1, 7.51, 7.6; 455/404.1, 435.3, 166.2
See application file for complete search history.

(56) References Cited

U.S. PATENT DOCUMENTS

| | | | | |
|---|---|---|---|---|
| 9,399,430 B2* | 7/2016 | Kirsch | ..................... | B60Q 9/00 |
| 2016/0294707 A1* | 10/2016 | Chen | ....................... | H04L 47/24 |

FOREIGN PATENT DOCUMENTS

| | | |
|---|---|---|
| JP | 2008-174952 A | 7/2008 |
| JP | 2013-134700 A | 7/2013 |
| KR | 10-0767494 B1 | 10/2007 |
| KR | 10-2010-0049194 A | 5/2010 |
| KR | 10-2012-0022279 A | 3/2012 |
| KR | 10-2013-0004588 | 1/2013 |
| KR | 10-1339005 B1 | 12/2013 |
| KR | 10-2014-0041005 A | 4/2014 |

OTHER PUBLICATIONS

Korean Office Action issued in Korean Application No. 10-2015-0021586, dated Jun. 2, 2016.

* cited by examiner

*Primary Examiner* — Toan N Pham
(74) *Attorney, Agent, or Firm* — McDermott Will & Emery LLP

(57) ABSTRACT

A method and apparatus for efficiently outputting information on generation of an event in a vehicle, when multiple smart devices are connected to the vehicle. The method and apparatus implement outputting event information by an AVN system of a vehicle, using multiple smart devices by detecting generation of an event, determining priorities of the smart devices for outputting event information corresponding to the generated event, determining whether the smart devices are connected to the AVN system, and requesting only a smart device having a highest priority among the connected smart devices, to output the event information.

12 Claims, 2 Drawing Sheets

METHOD AND APPARATUS FOR OUTPUTTING VEHICLE ALARM INFORMATION USING MOBILE DEVICES

CROSS-REFERENCE TO RELATED APPLICATION

This application claims the benefit of priority to Korean Patent Application No. 10-2015-0021586, filed on Feb. 12, 2015, in the Korean Intellectual Property office which is hereby incorporated by reference as if fully set forth herein.

TECHNICAL FIELD

The present disclosure relates to a method and apparatus for efficiently determining a mobile device for outputting information about generation of an event related to a vehicle, when multiple mobile devices are connected to the vehicle.

BACKGROUND

Smart devices are remarkably popularized these days. As such, many drivers carry multiple smart devices such as a smartphone, a smart watch, smart glasses, etc. in a vehicle and these devices have communication functions to interwork with the vehicle.

Major functions of these devices associated with the vehicle include content sharing, output sharing, and providing warnings/alarms. In the case of the warning/alarm providing function, if all of the devices connected to the vehicle output warnings/alarms upon a single event, this can disturb the driver. For example, if a warning/alarm event is generated when the driver carries a smartphone and wears a smart watch and smart glasses, the same warning/alarm message can be individually displayed on an audio/video/navigation (AVN) system, the smartphone, the smart watch and the smart glasses and thus the driver may be inconvenienced.

Accordingly, if a warning/alarm event is generated when multiple mobile/smart devices are present in a vehicle (particularly, when connected to the vehicle), a device for outputting the warning/alarm needs to be efficiently determined

SUMMARY

Accordingly, the present disclosure is directed to a method for outputting vehicle alarm information using mobile devices, and an apparatus for performing the method, which substantially obviate one or more problems due to limitations and disadvantages of the related art.

An object of the present disclosure is to provide a method for efficiently determining a device for outputting alarm information related to an event when multiple mobile devices are connected to a vehicle, and an apparatus for performing the method.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method for outputting event information using multiple smart devices by an audio/video/navigation (AVN) system of a vehicle includes detecting generation of an event, determining priorities of the smart devices for outputting event information corresponding to the generated event, determining whether the smart devices are connected to the AVN system, and requesting only a smart device having a highest priority among the connected smart devices, to output the event information.

In another aspect of the present disclosure, an audio/video/navigation (AVN) system of a vehicle for outputting event information using multiple smart devices includes a wireless communication unit connected to the smart devices; and a controller for detecting generation of an event, determining priorities of the smart devices for outputting event information corresponding to the generated event, to determine whether the smart devices are connected to the AVN system, and controlling the wireless communication unit to request only a smart device from the multiple smart devices having a highest priority among the connected smart devices, to output the event information.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the invention and together with the description serve to explain the principle of the disclosure. In the drawings.

DETAILED DESCRIPTION

Figure 1:
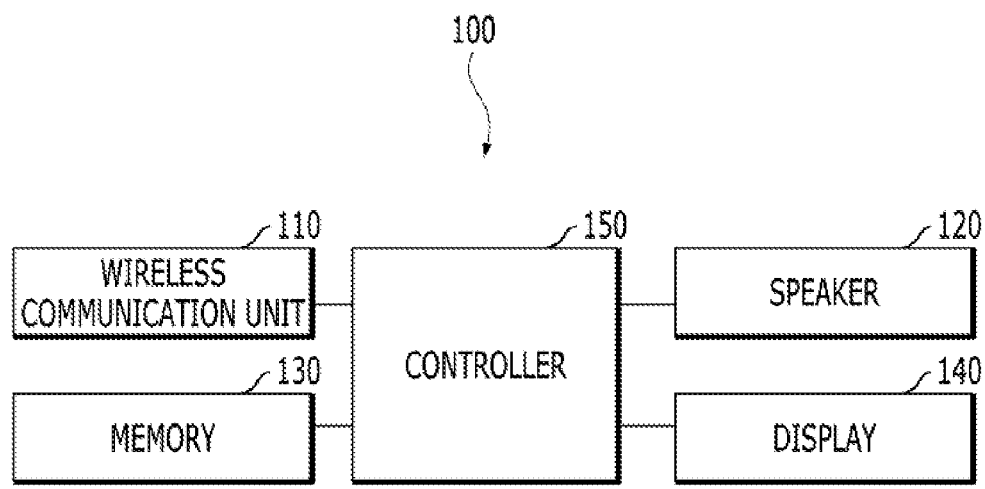
FIG. 1 is a block diagram of an audio/video/navigation (AVN) system of a vehicle according to an embodiment of the present invention.

Reference will now be made in detail to the preferred embodiments of the present invention, examples of which are illustrated in the accompanying drawings. Like reference numerals in the drawings denote like elements and repeated descriptions thereof will be omitted. The suffixes "module", "er/or" and "unit" of elements herein are used for convenience of description and thus can be used interchangeably and do not have any distinguishable meanings or functions.

In the following description of the present disclosure, a detailed description of known functions and configurations incorporated herein will be omitted when it may make the subject matter of the present disclosure unclear. It should be understood that there is no intent to limit exemplary embodiments of the invention to the particular forms disclosed, rather, exemplary embodiments of the invention are to cover all modifications, equivalents, and alternatives falling within the spirit and scope of the disclosure.

The present disclosure proposes to subdivide event information generated during driving vehicle among smart devices connected to the vehicle, for example, based on warning/alarm types, and types of warnings/alarms the smart devices are capable to output, and thus to allow only a device having high efficiency to give a warning/alarm to the driver.

A device configuration for implementing embodiments of the present invention is now described.

FIG. 1 is a block diagram of an audio/video/navigation (AVN) system 100 of a vehicle, according to an embodiment of the present invention.

Referring to FIG. 1, the AVN system 100 of the vehicle may include a wireless communication unit 110 connected to at least one mobile (smart) device (not shown) in a wireless manner to transmit warning/alarm information corresponding to generation of an event to the connected mobile device; a speaker 120 for outputting navigation sound, content sound, or sound-type warning/alarm information; a memory 130 for storing navigation map information, multimedia content, or setting information; a display 140 for outputting the navigation map information or image information of the multimedia content, or visually outputting the warning/alarm information; and a controller 150 for controlling the aforementioned elements and performing determination and calculation required to implement the current embodiment. The determination of the controller 150 will be described below with reference to FIGS. 2 and 3.

Figure 2:
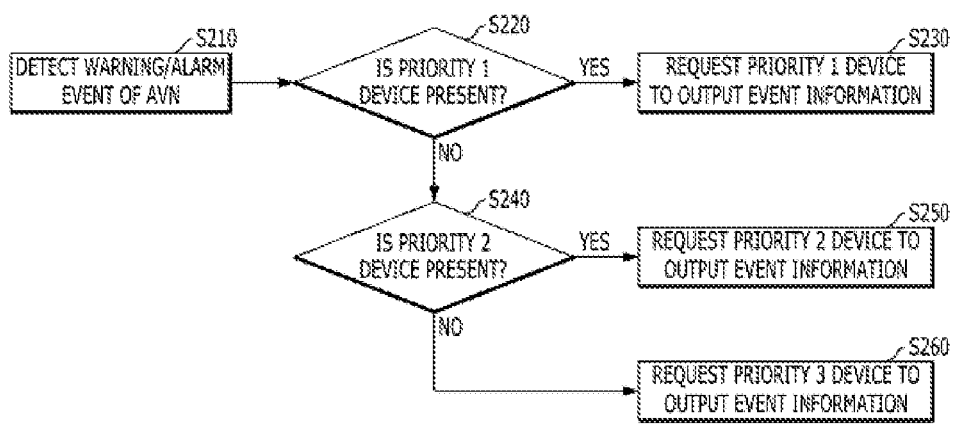
FIG. 2 illustrates a procedure of selecting a device for outputting an alarm/warning among multiple devices connected to an AVN system of a vehicle, according to an embodiment of the present invention.
Figure 3:
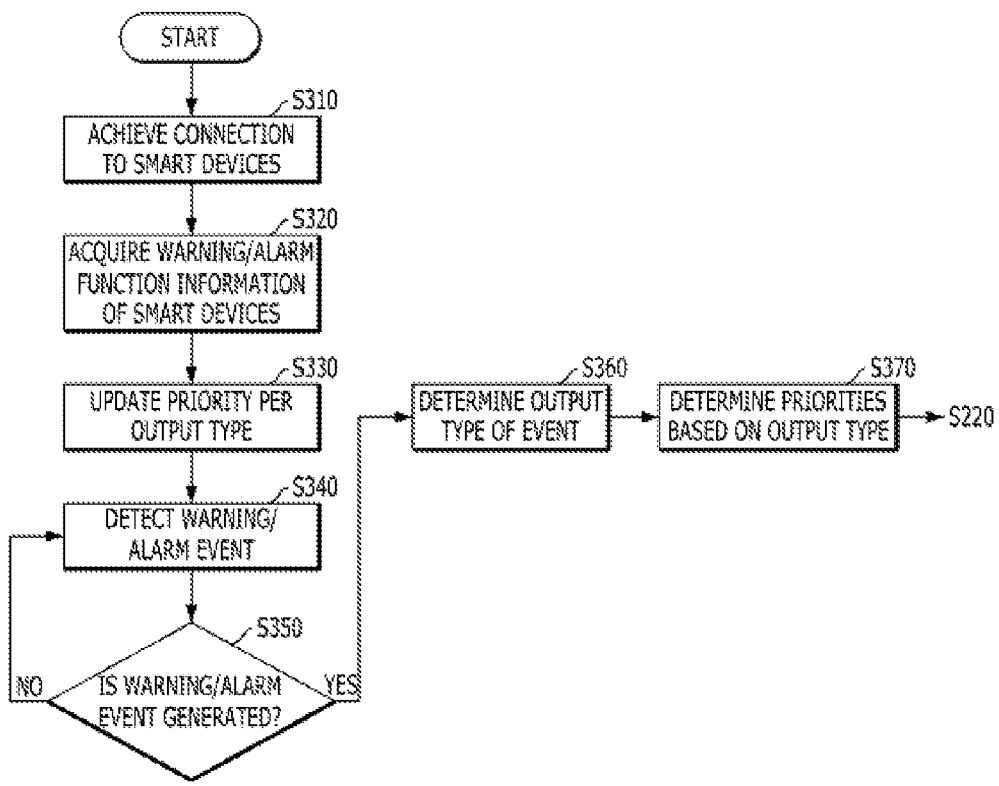
FIG. 3 illustrates a procedure of determining an output type of an event and determining a priority device per type to select a device for outputting an alarm/warning from among multiple devices connected to an AVN system of a vehicle, according to an embodiment of the present invention.

Prerequisites for FIGS. 2 and 3 are now described using specific examples of types of smart devices capable of outputting information about warning/alarm events generated in a vehicle, to a driver, types of warnings/alarms, and priorities set per type.

Initially, in this specification, it is assumed for convenience of explanation that a driver has three smart devices such as a smartphone, a smart watch and smart glasses in addition to an AVN system of a vehicle, and all of the smart devices are wirelessly connected to the AVN system.

The above-mentioned devices may have different capabilities of outputting types of alarms/warnings (i.e., functions). An example of the functions of the devices is defined in Table 1.

TABLE 1

| Device | Output Type | Remarks |
| --- | --- | --- |
| AVN | Display/Sound | Equipped in vehicle |
| Smartphone | Message/Sound | |
| Smart watch | Vibration/Sound | |
| Smart glasses | Display/Sound/Vibration | |

Referring to Table 1, examples of output types supported by each device, i.e., methods for giving a warning/alarm to a driver by each device when connected to the AVN system, are defined.

In addition, the AVN system preliminarily stores information about the type of device efficient to give a warning/alarm to the driver, per output type. An example thereof may be defined as shown in Table 2.

TABLE 2

| Output Type | Priority 1 Device | Priority 2 Device | Priority 3 Device |
| --- | --- | --- | --- |
| Sound | AVN | AVN | AVN |
| Display | Smart glasses | AVN | AVN |
| Vibration | Smart watch | Smart glasses | Smartphone |
| Message | Smartphone | Smart watch | AVN |

Referring to Table 2, the AVN system has the highest priority for sound output, and the smart glasses have first priority (priority 1) and the AVN system has second priority (priority 2) for Display output. In addition, the AVN system may be excluded from vibration output.

Furthermore, warning/alarm events and output types thereof to the driver may be defined as shown in Table 3.

TABLE 3

| Warning/Alarm Event | Output Type | Remarks |
| --- | --- | --- |
| Navigation left/right turn information | Display/Sound | |
| Speeding | Sound/Vibration/Display | |
| Bad health condition | Vibration/Sound | |
| Detailed information about breakdown generated while driving | Sound/Vibration/Message | Detailed information about a part which needs to be repaired (e.g., engine/tire) Long information which can disturb the driver when it is given using sound while driving A warning/alarm which should given as a text message to the driver after driving |

A procedure of selecting a device for outputting an alarm/warning by considering event and output types per connected device, according to an embodiment of the present invention is now described with reference to FIGS. 2 and 3.

Unless otherwise specified, it is assumed that the information of Tables 1 to 3 is preliminarily set in the vehicle.

FIG. 2 illustrates a procedure of selecting a device for outputting an alarm/warning from among multiple devices connected to an AVN system of a vehicle, according to an embodiment of the present invention.

Referring to FIG. 2, the AVN system may detect generation of an event which requires output of a warning/alarm (S210).

As such, the AVN system determines, at s220, whether a priority 1 device supporting output of a type corresponding to the detected event is present, for example, currently connected. When the priority 1 device is present (s220, Yes), the AVN system requests, at s230, the priority 1 device to output an alarm/warning. When the priority 1 device is not present (s220, No), the AVN system determines, at s240, whether a priority 2 device is present. When the priority 2 device is present (S240, Yes), the AVN system requests, at s250, the priority 2 device to output an alarm/warning. When the priority 2 device is not present (S240, No), the AVN system requests, at s260, a priority 3 device to output an alarm/warning.

The above-described step of S210 is now described in detail with reference to FIG. 3.

FIG. 3 illustrates a procedure of determining an output type of an event related to a vehicle and determining a priority device per type to select a device for outputting an alarm/warning from among multiple devices connected to an AVN system of the vehicle, according to an embodiment of the present invention.

Referring to FIG. 3, initially, multiple smart devices may be connected to the AVN system using wireless communication technology such as Wi-Fi or Bluetooth (S310).

At block s320, the AVN system acquires capability information of each of the connected smart devices and determines output types supported by each device among output types such as sound, display and vibration. As such, for example, the information of Table 1 may be updated.

At block s330, the AVN system may update priority per output type based on the determined capability information. As such, for example, the information of Table 2 may be updated.

Subsequently, the AVN system detects, at block s340, whether a warning/alarm event is generated. For as long as an event is not generated (s350, No), the AVN system performs block s340 for detecting an event. When the event is generated (S350, Yes), the AVN system may determine, at block s360, an output type corresponding to the generated event. In this case, the output type may be determined based on, for example, the information of Table 3. In addition, the AVN system may determine whether the event is generated, using a controller area network (CAN) signal transmitted from a controller of the vehicle.

When the output type is determined, the AVN system may determine, at block s370, priorities of the devices based on the output type.

A procedure thereafter is the same as the procedure from S220 of FIG. 2, and a repeated description thereof will be omitted here for brevity.

According to at least one embodiment of the present invention, the following effects are achieved.

A device for outputting alarm information may be efficiently determined.

Particularly, priorities of devices may be set in an order in which output to a driver is efficient, based on an output type of alarm information.

It will be appreciated by persons skilled in the art that the effects that could be achieved through the present disclosure which are not limited to what has been particularly described hereinabove, and other advantages of the present disclosure will be more clearly understood from the detailed description.

The present disclosure can also be embodied as computer-readable code on a computer-readable recording medium. The computer-readable recording medium is any data storage device that can store data which can be thereafter read by a computer system. Examples of the computer-readable recording medium include hard disk drives (HDDs), solid state disks (SSDs), silicon disk drives (SDDs), read-only memory (ROM), random-access memory (RAM), CD-ROMs, magnetic tapes, floppy disks, and optical data storage devices.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method for outputting event information by an audio/video/navigation (AVN) system of a vehicle, using a plurality of smart devices, the method comprising:

achieving connection to the plurality of smart devices;
acquiring information about output types supported by the connected smart devices,
updating priority information per output type using the acquired information;
detecting generation of an event;
determining priorities of the plurality of smart devices for outputting event information corresponding to the generated event;
determining whether the plurality of smart devices are connected to the AVN system; and
requesting only a smart device having a highest priority among the connected smart devices, to output the event information.

2. The method according to claim 1, wherein the determining the priorities of the plurality of smart devices comprises:

determining an output type of the event information; and
determining the priorities of the plurality of smart devices, using the updated priority information per output type.

3. The method according to claim 2, wherein the determining the output type of the event information is performed based on a third table in which an output type per event is preliminarily stored.

4. The method according to claim 1, wherein the information about the output types supported by the connected smart devices is stored in a first table, and wherein the priority information per output type is stored in a second table.

5. The method according to claim 1, wherein the detecting generation of the event comprises receiving a signal from a controller area network (CAN) communication system indicating generation of the event.

6. The method according to claim 1, wherein the output types comprise vibration output, sound output and display output.

7. The AVN system according to claim 1, wherein the controller determines an output type of the event information, and determines the priorities of the plurality of smart devices, using the updated priority information per output type.

wherein the priority information per output type is stored in a second table.

8. The AVN system according to claim 7, wherein the controller determines the output type of the event information based on a third table in which an output type per event is preliminarily stored.

9. The AVN system according to claim 1, wherein the information about the output types supported by the connected smart devices is stored in a first table, and wherein the priority information per output type is stored in a second table.

10. The AVN system according to claim 1, wherein the output types comprise vibration output, sound output and display output.

11. An audio/video/navigation (AVN) system of a vehicle for outputting event information using a plurality of smart devices, the AVN system comprising:

a wireless communication unit connected to the plurality of smart devices; and
a controller for detecting generation of an event, determining priorities of the plurality of smart devices for outputting event information corresponding to the generated event, to determine whether the plurality of smart devices are connected to the AVN system, and controlling the wireless communication unit to request only a smart device having a highest priority among the connected smart devices, to output the event information, wherein the controller acquires information about output types supported by the connect smart devices, and updates priority information per output type using the acquired information.

12. The AVN system according to claim 11, wherein the controller detects generation of the event by receiving a signal from a controller area network (CAN) communication system indicating generation of the event.

\* \* \* \* \*